US009698848B2

(12) United States Patent
Phang

(10) Patent No.: US 9,698,848 B2
(45) Date of Patent: Jul. 4, 2017

(54) PROTECTIVE CASE ACCESSORY WITH MULTI-FUNCTION BUTTON FOR SMART-PHONE DEVICE

(71) Applicant: Wayne Phang, Coral Springs, FL (US)

(72) Inventor: Wayne Phang, Coral Springs, FL (US)

(73) Assignee: Cane Wireless Inc., Coral Springs, FL (US)

(*) Notice: Subject to any disclaimer, the term of this patent is extended or adjusted under 35 U.S.C. 154(b) by 0 days.

(21) Appl. No.: 14/938,908

(22) Filed: Nov. 12, 2015

(65) Prior Publication Data

US 2016/0142093 A1    May 19, 2016

Related U.S. Application Data

(60) Provisional application No. 62/079,712, filed on Nov. 14, 2014.

(51) Int. Cl.
*H04B 1/38* (2015.01)
*H04B 1/3888* (2015.01)
*H04W 4/00* (2009.01)
*H04M 1/18* (2006.01)
*H04M 1/725* (2006.01)

(52) U.S. Cl.
CPC .......... *H04B 1/3888* (2013.01); *H04M 1/185* (2013.01); *H04M 1/7253* (2013.01); *H04M 1/72527* (2013.01); *H04W 4/008* (2013.01)

(58) Field of Classification Search
CPC ................ H04B 1/3888; H04M 1/0202

USPC ............... 455/575.1, 575.8, 90.3, 575.6, 557
See application file for complete search history.

(56) References Cited

U.S. PATENT DOCUMENTS

| | | | | |
|---|---|---|---|---|
| 8,428,644 | B1* | 4/2013 | Harooni | H04B 1/3888 362/551 |
| 9,025,317 | B2* | 5/2015 | Richardson | H04M 1/0252 361/679.01 |
| 9,160,189 | B2* | 10/2015 | Glanzer | G06K 7/082 |
| 2013/0182387 | A1* | 7/2013 | Mere | G06F 1/1626 361/679.41 |
| 2014/0099526 | A1* | 4/2014 | Powell | H01M 2/1066 429/100 |
| 2014/0138265 | A1* | 5/2014 | Bong | A45C 11/00 206/37 |
| 2015/0180527 | A1* | 6/2015 | Fathollahi | H04B 1/3888 455/575.8 |
| 2015/0341712 | A1* | 11/2015 | Wilcox | H04R 7/045 381/332 |

\* cited by examiner

*Primary Examiner* — John J Lee
(74) *Attorney, Agent, or Firm* — Pablo Meles

(57) ABSTRACT

A protective case accessory with integrated Multifunction button configured for attachment to a cellular smartphone device, facilitating the initiation of embedded features or software applications, or both, when attached to the Smartphone device. The invention includes a Multifunction button integrated into a protective case accessory and preferably uses a Bluetooth transceiver to connect wirelessly to a smartphone device to send and receive audio or data communication, or both.

20 Claims, 6 Drawing Sheets

PROTECTIVE CASE ACCESSORY WITH MULTI-FUNCTION BUTTON FOR SMART-PHONE DEVICE

CROSS REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The invention relates to the field of protective case accessory for cellular Smartphone devices and Software Applications running on such devices. More specifically, the invention comprises a Multi-Function button integrated into a cellular smartphone protective case accessory, using a Bluetooth transceiver also embedded in the smartphone protective case accessory that is configured to attach to a smartphone device, facilitating the initiation or activation of features or software applications running on the Smartphone device, or both and also serves as a protective case for the smartphone device.

2. Description of Related Art

There are many known protective case devices for protecting hand-held smartphone devices. Most of these are made from plastic or rubber or a combination of both and have no interaction with the cellular phone device and serve only to protect such device and sometimes adding aesthetic value to the user. However, there are some protective cases that do interact with the cellular phone device. Some offer back up power to extend the cellular phone talk time or some may include an integrated card reader that facilitates scanning of a credit card and communicating the card information to the cellular phone that uses a software application to process the credit card information. These devices may use electrical connections such as conductive metal contacts or wireless connections such as Bluetooth, to interface to the cellular phone device.

Portable smart phone devices facilitate the use of a plethora of applications available for download from any available APP store that allow the device to be used for multiple applications such as gaming, social networking, navigation and many more. There are available accessories that connects wirelessly to the Smartphone or plug into the accessory jack on the Smartphone, that when combined with a software application running on the Smartphone, serves as a multifunction button allowing the user to activate features and applications on the phone by using a series of pre-programmed presses of the multifunction button to activate each feature or software application. One such type of application is programming a short press of the multifunction button to activate the camera feature in the Smartphone to take a picture. Another application is programming a long press of the multifunction button to toggle the mute function or flashlight application on the Smartphone. There can also be a series of long and short presses of the multifunction button programmed to activate any of the embedded features or downloaded software applications on the Smartphone. By using a dedicated button to activate select features or application on the Smartphone it allows the user to quickly access and activate the feature without having to turn on the display, unlock the phone, select the feature or application and activate it.

Available multifunction button accessories for Smartphone's such as those that are inserted into the accessory connector of the Smartphone prevents the use of wired accessories when plugged in and can be misplaced if removed. Alternatively, wireless multifunction buttons although still allowing access to the accessory connector on the Smartphone can also be misplaced or is designed to be mounted in a fixed location (such as in a vehicle) thus limiting the use of the multifunction button.

Standard smart-phone protective case accessories, although providing variable amount of protection and sometimes interfacing with the portable smart-phone device, do not facilitate the use of a multifunction button, providing easier and quicker access to activate features and software applications on the Smartphone and providing tactical feedback to the user and ease of use when wearing gloves. Therefore, there is room for improvement within the art.

BRIEF SUMMARY OF PRESENT INVENTION

The present invention integrates a multifunction button into a protective case for a smartphone device, allowing for quicker access to activate embedded features and software applications running on smartphone devices without the need to unlock the phone and access the application, which would require additional time and reduce the battery life (extended operation of display). The multifunction button, when activated, preferably sends data by means of a Bluetooth connection to the smartphone device, prompting the features or software application running on the smartphone device to activate. Having the multifunction button integrated into the Smartphone protective case accessory provides easy access to a physical button allowing the user to operate Smartphone features such as the camera, or software applications, such as Google Maps, quickly even when wearing gloves. The present invention also functions as a protective case for the smartphone device adding value for the user.

The Bluetooth transceiver is embedded into the protective case and preferably powered by a rechargeable or non-rechargeable type battery and may contain a method of charging rechargeable batteries. The protective case is preferably attached to the smartphone device, preferably by the use of mechanical features similar to those used in a typical protective cases designed for such devices.

The protective case may also contain a means of providing auxiliary power to the smartphone device, functioning as a battery life extender or charger for the smartphone device. This is preferably implemented with a DC to DC voltage converter that provides a fixed voltage to the smartphone device preferably by electrically conductive metal contacts interfacing with the charging contacts or jack on the smartphone device.

Although the use of Bluetooth as a means of communicating to the smartphone is proposed in this invention, it should not be limited as such. Other methods such as connecting directly to existing data ports with electrically conductive metal contacts on the smartphone device such as the accessory jack or multifunction connector (also typically used for charging the smartphone device) by means of a electrical connection and sending data to the smartphone to operate the PTT application. Alternately, the Multifunction button could replace the function of any one or more of the existing buttons on the Smartphone such as the Up or Down volume buttons by making that button larger in the protective case and reassigning the function in the accompanying software application. In this case the multifunction button would have mechanical features to allow it to press the existing button on the smartphone to activate the desired feature or application and there would be no need for electrical or wireless connection between the protective case accessory and the smartphone.

The invention preferably includes an audio amplifier and speaker to increase the audio output of the Smartphone. This invention is not limited for use with smartphone devices and could be used with tablets or any handheld smart devices that is capable of running software applications.

REFERENCE NUMERALS IN THE DRAWINGS

Figure 1:
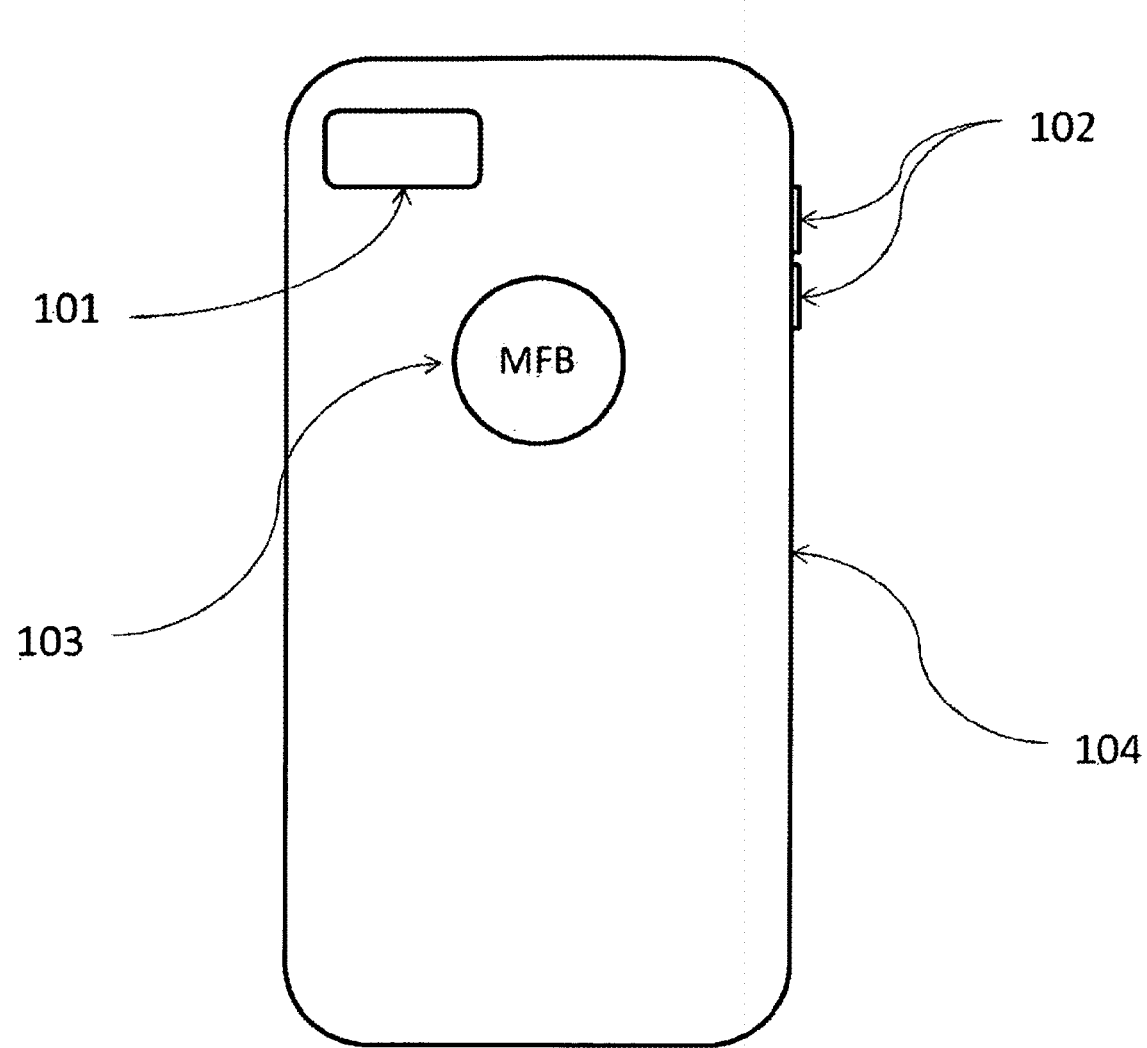
FIG. 1 is a view of the rear profile of the invention, when attached to smartphone device, showing the preferred layout of the multifunction button.

101 Opening for smartphone camera lens
102 Volume/Scroll buttons
103 Multifunction button (MFB)
104 Protective case accessory
105 Opening to retain removable Multifunction button
301 Charging and data port
302 Accessory port
401 Battery
402 Audio amplifier
403 Bluetooth transceiver
404 Loudspeaker
501 Voltage multiplier
502 Voltage regulator
503 Smartphone device

DETAILED DESCRIPTION OF THE INVENTION

FIG. 1 shows the rear view of the present invention in an assembled state. The protective case accessory 104 is configured to attach to a cellular smartphone device (not shown), preferably to the rear of the device. Of course, the invention includes features that would allow it to readily and securely attach as shown, though the reader should bear in mind that many other possibilities to securely attach the protective case accessory 104 to the smartphone device exists. Such methods include adhesives, form fitted rubber over-mold, screws, snaps etc. Slots 101 in the protective case accessory 104 allow access to the smartphone camera lens that is used to take pictures or video. Alternately, the slot could be sealed with a clear plastic or glass lens to prevent water and dust from getting to the smartphone device in a ruggedized or water resistant protective case. The multifunction button 103 is preferably placed at the rear of the protective case device 104 to allow for easy access but the reader should bear in mind that there are many other locations where the multifunction button could be placed in the protective case to achieve similar function. One such alternative would be to place the multifunction button 103 on the side of the protective case accessory 104. Another alternative would be to place the multifunction button on the top of the protective case accessory 104. The Multifunction button 103 is positioned in the housing of the protective case accessory 104 such that the user has easy access while holding the smartphone device in an assembled state. Electrical elements (not shown) embedded in the housing of the protective case accessory 104 allow initiation of the features and software applications when the multifunction button is pressed. Although not shown in the present embodiment, LED indicator(s) to show power or operating status would be preferred.

Figure 2:
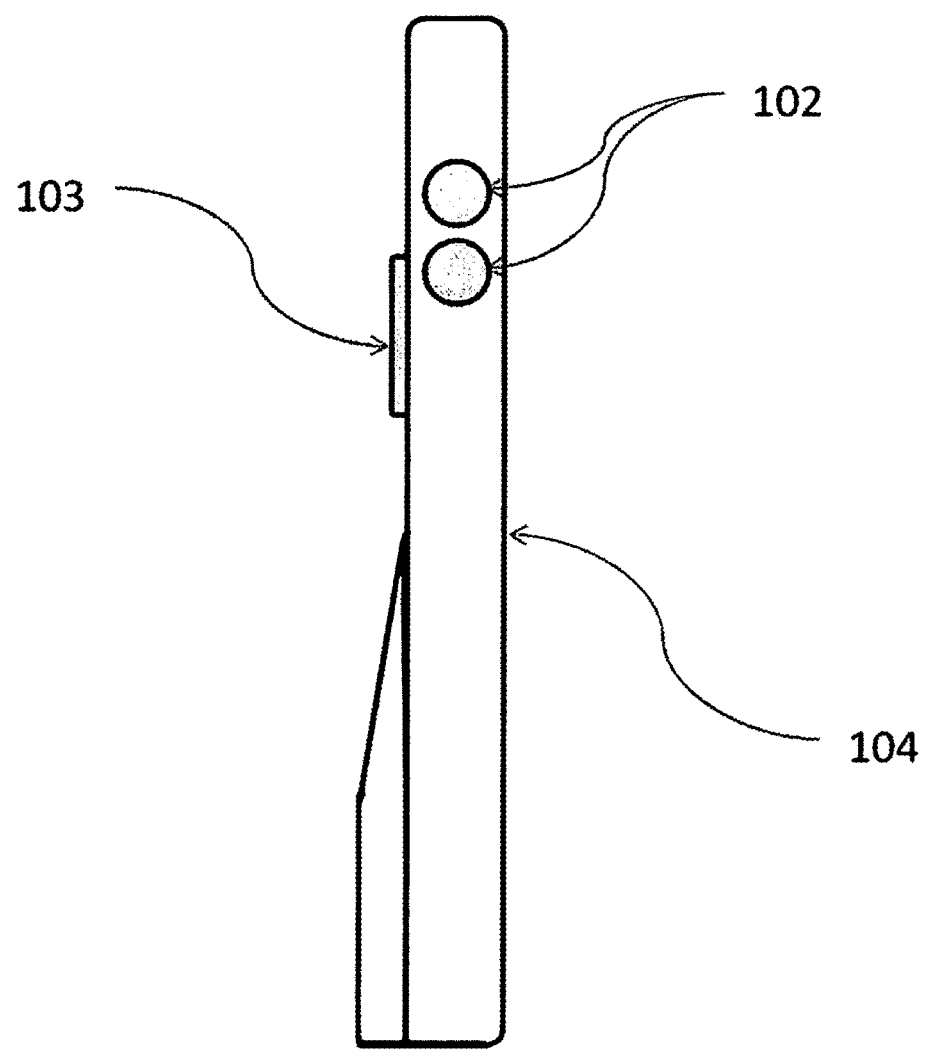
FIG. 2 is a view of the left side profile of the invention, when attached to the smartphone device.

FIG. 2 shows a perspective view of the left side of the present invention in an assembled state. The volume and scroll buttons 102 facilitates the use of the volume and scroll buttons existing on the smartphone device (not shown).

Figure 3:
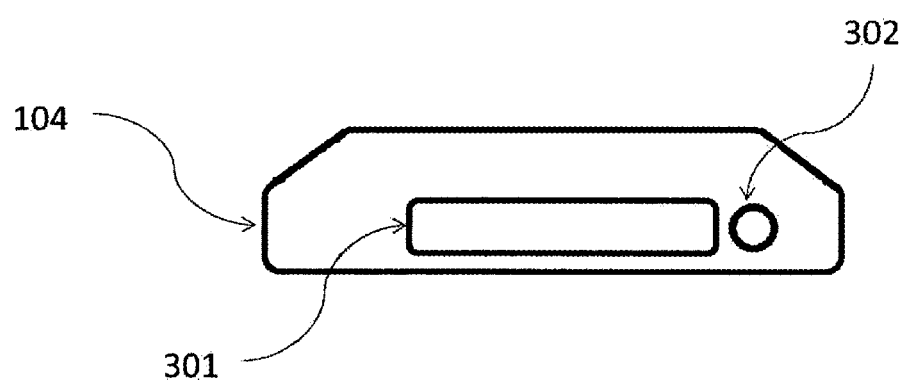
FIG. 3 is a view of the bottom profile of the invention, when attached to the smartphone device, showing the accessory port and charging port.

FIG. 3 is a perspective view of bottom of the present invention, when attached to the smartphone device, showing slots in the protective case accessory for accessing the smartphone device's accessory port 302 and charging port 301. It is preferred that a multifunction LED is used to show power or operating status. The reader should bear in mind that although a status LED is preferred as described in the embodiment of the invention, there are many other options to provide status indication to the user such as using multiple LED's, LCD displays, vibration, audible tones etc.

Figure 4:
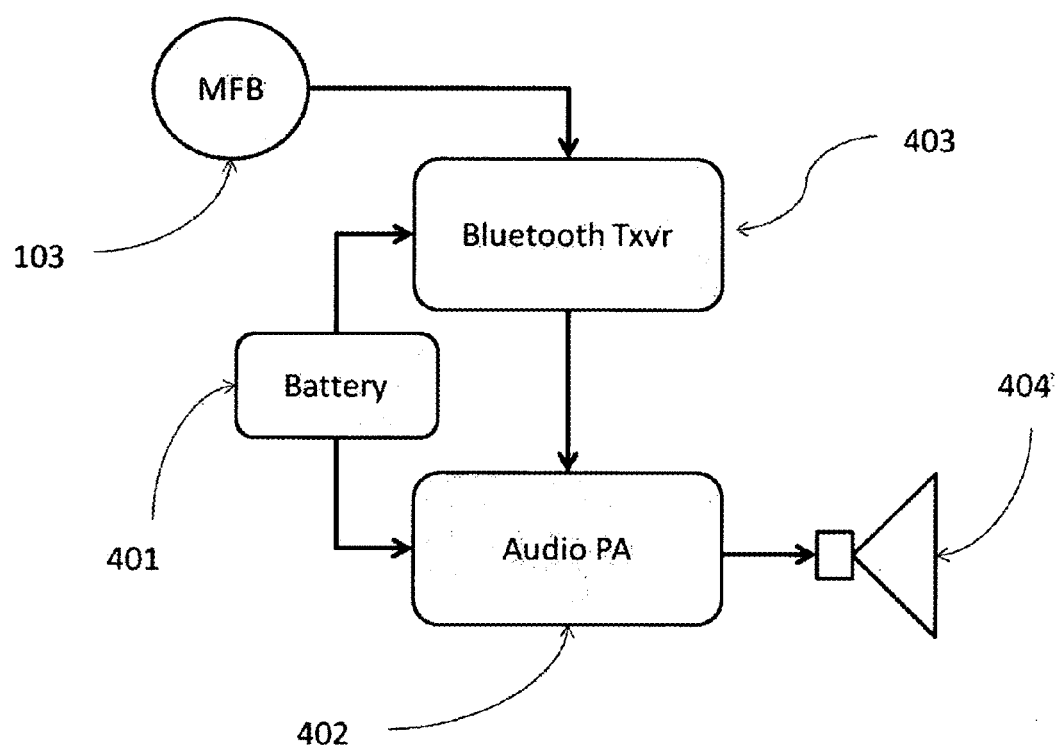
FIG. 4 is a block diagram of the invention.

FIG. 4 shows the block diagram of the present invention. The multifunction button 103 when pressed completes an electrical circuit (not shown in embodiment) that signals the Bluetooth transceiver 403 to send a data command to the Smartphone device to activate the desired feature or software application on the Smartphone. Alternatively, whenever the speakerphone feature is enabled or loud audio is selected by software applications running on the Smartphone device, it sends the audio signal over the Bluetooth link to the Bluetooth transceiver 403 embedded in the protective case accessory. The audio signal is then demodulated and amplified by the audio amplifier 402 and transmitted to the speaker 404 in the protective case accessory. This allows for higher audio output when the protective case accessory is attached to the smartphone device.

Figure 5:
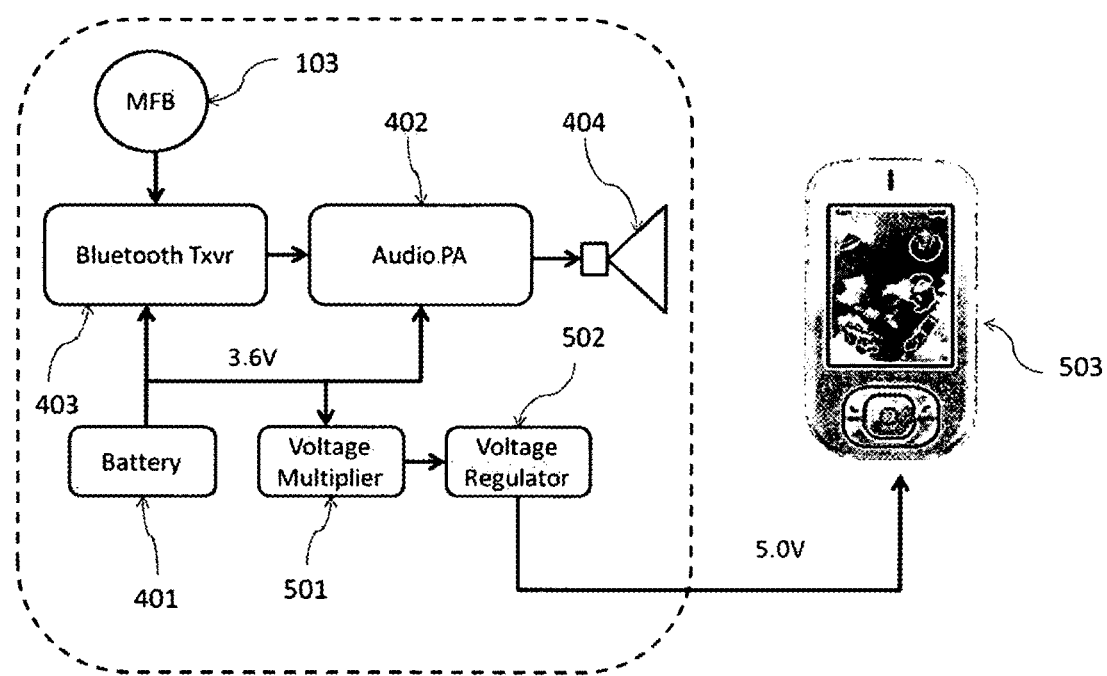
FIG. 5 is a block diagram of the invention, showing power distribution from the embedded battery in the protective case device to the smartphone device.

FIG. 5 is a block diagram of the preferred power distribution showing the transfer of power from the protective case accessory to the smartphone device 503. Preferably, the battery 401 in the protective case accessory powers the Bluetooth transceiver 403 and the audio amplifier 402. Additionally, it is preferred that the battery output is connected to a DC to DC voltage multiplier 501 to increase the voltage from the battery which is then regulated by the voltage regulator 502 preferably to 5.0 Volts. This voltage regulator 502 output is then connected to the smartphone device 503 charging contacts (not shown) and distributed to the charging circuit (not shown) to charge the battery (not shown) in the smartphone device 503. All the electronic components are connected using electrical conductors.

Figure 6:
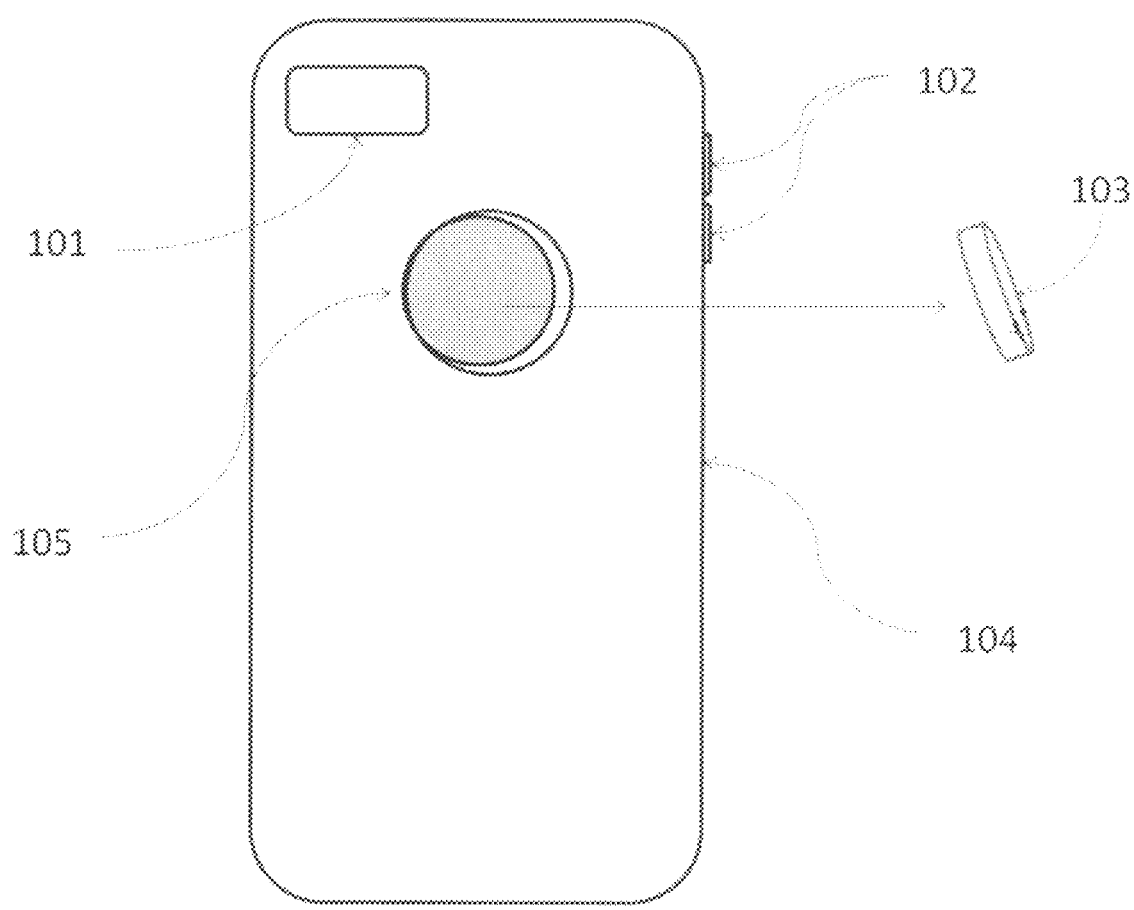
FIG. 6 is a view of the rear profile of the device showing a removable Multifunction button (MFB).

FIG. 6 shows the rear view of an alternate application of the present invention with the MFB 103 disassembled from the protective case 104. The MFB button 103 contains all the electrical components (not shown) necessary to wirelessly connect to the smartphone device. Examples are Bluetooth wireless module, battery to power the Bluetooth module, LED and button all encased in a separate mechanical housing that forms the MFB 103. The protective case 104 is configured with a opening to retain the MFB 103 while still allowing it to be removed if intended to be used remotely.

Although the preceding description contains significant detail, it should not be construed as limiting the scope of the invention but rather providing illustrations of the preferred embodiments of the invention.

Having described my invention, I claim:

1. A protective case accessory configured for attachment to a smart phone device, comprising:
    a protective case;
    a multifunction button removably embedded in the protective case or removably integrated with the protective case; and
    a wireless transceiver coupled to the multifunction button configured to communicate with the smartphone device and configured to initiate multiple functions of the smartphone device including at least one camera function and at least one among a push-to-talk (PTT) application, an up and down volume function, or a mapping application.

2. The protective case accessory of claim 1, wherein the wireless transceiver comprises a Bluetooth transceiver to wirelessly communicate with the smartphone device.

3. The protective case accessory of claim 2, further comprising a battery that powers the Bluetooth transceiver.

4. The protective case accessory of claim 3, wherein the Bluetooth transceiver uses a serial connection to transfer data to the smartphone device to initiate embedded features and software applications running on the smartphone device.

5. The protective case accessory of claim 1, wherein the multifunction button includes a switch to activate embedded features or software applications unrelated to the at least one camera function running on the smartphone device.

6. The protective case accessory of claim 1, further comprising a battery coupled to the wireless transceiver, and the multifunction button.

7. The protective case accessory of claim 1, further comprising an audio amplifier and a speaker embedded in the protective case.

8. The protective case accessory of claim 1, further comprising a battery coupled to the wireless transceiver, the multifunction button, an audio amplifier and a speaker.

9. The protective case accessory of claim 8 wherein the battery is further coupled to a voltage multiplier and voltage regulator integrated with the protective case.

10. The protective case accessory of claim 1, further comprising a connector to electrically connect to an audio accessory port of the smartphone device.

11. The protective case accessory of claim 1, comprising a connector to electrically connect to a charging port of the smartphone device.

12. The protective case accessory of claim 1, further comprising an opening in the protective case to retain the multifunction button, wherein the multifunction button operates independent of being retained within the opening.

13. The protective case accessory of claim 1, wherein the multifunction button uses a mechanical lever to press an existing button on the smartphone device.

14. The protective case accessory of claim 1, wherein the multifunction button is a self contained wireless device that can be detached and used separately from the protective case.

15. A protective case accessory configured for attachment to a smartphone device, comprising:
    a protective case;
    a multifunction button removably integrated with the protective case; and
    a wireless transceiver coupled to the multifunction button configured to communicate with the smartphone device and configured to initiate multiple camera and non-camera functions of the smartphone device without having to unlock the smartphone device.

16. The protective case accessory of claim 15, wherein the wireless transceiver comprises a Bluetooth transceiver to wirelessly communicate with the smartphone device.

17. The protective case accessory of claim 15, further comprising a battery coupled to the wireless transceiver, the multifunction button, an audio amplifier and a speaker.

18. The protective case accessory of claim 15, wherein the multifunction button is configured to activate select features or applications on the smartphone device without having to unlock the smartphone.

19. A multifunction button removably integrated with a protective case used to protect a smartphone device, comprising:
    a wireless transceiver coupled to the multifunction button configured to communicate with the smartphone device and configured to initiate multiple camera and non-camera functions of the smartphone device without having to unlock the smartphone device; and
    a housing for the multifunction button configured to be removably attached to the protective case via an opening in the protective case.

20. The multifunction button of claim 19, further comprising a battery coupled to the wireless transceiver, an audio amplifier and a speaker.

* * * * *